United States Patent Office 3,655,643
Patented Apr. 11, 1972

3,655,643
14β-HYDROXY-15α-ACYLOXY-CARDENOLIDES
Hans-Gunter Lehmann, Georg Zollner, and Rudolf
 Wiechert, Berlin, Germany, assignors to Schering Ak-
 tiengesellschaft, Berlin, Germany
No Drawing. Filed July 27, 1970, Ser. No. 58,652
Claims priority, application Germany, July 29, 1969,
P 19 39 164.1
Int. Cl. C07c *173/00*
U.S. Cl. 260—210.5                         21 Claims

ABSTRACT OF THE DISCLOSURE

14β-hydroxy-15α-acyloxy-cardenolides of the formula

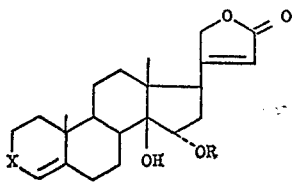

wherein —OR is an esterified hydroxy group and X is >C=O or >CH—OR' in which —OR' is a free or esterified hydroxy group, tetrahydropyranyloxy group or similar readily cleavable glycoside group are cardioactive compounds which increase heart strength without reducing heart frequency.

BACKGROUND OF THE INVENTION

This invention relates to novel 14β-hydroxy-15α-acyloxy-cardenolides.

Investigations conducted by T. Shigei and S. Mineshita (cf. "Experientia" 24, 466 [1968]) showed that 14β,15α-dihydroxy-cardenolides do not exhibit cardioactive effects.

Moreover, it is known from circulatory and cardiac therapy that the customarily employed natural cardiac glycosides which exhibit a usable heart strengthening effect also lower heart beat rate, i.e., tend to induce bradycardia. Consequently, the natural cardiac glycosides are unsuitable for the treatment of certain circulatory and cardiac diseases, such as, for example, bradycardiac insufficiency and aortic valve insufficiency, although their heart-strengthening effect is urgently required.

It has now been discovered that, when using the 14β-hydroxy-15α-acyloxy-cardenolides of this invention, the above-described disadvantages of the natural cardiac glycosides are avoided. As evidenced in experiments conducted on isolated, spontaneously beating cat atria, the compounds of this invention exhibit a positively inotropic effect, like the natural cardiac glycosides, but without reducing heart beat rate.

SUMMARY OF THE INVENTION

According to this invention, novel cardioactive 14β-hydroxy-15α-acyloxy-cardenolides of the formula

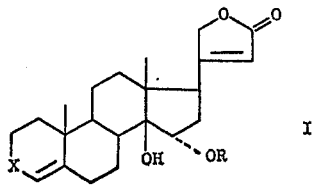

wherein —OR is an esterified hydroxy group and X is >C=O or >CH—OR' in which —OR' is a free or esterified hydroxy group, tetrahydropyranyloxy group, or glycosidal etherified hydroxy group are prepared by the esterification of a 14β,15α-dihydroxy-cardenolide of the formula

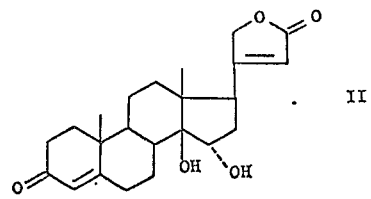

and, if a 3-oxy product is desired, the 3-keto group of the esterified product is subsequently reduced and, if desired, the 3-hydroxy group of the thus-obtained reduced product is optionally acylated or acetalized.

DETAILED DISCUSSION

The compounds of this invention have an esterified hydroxy group in the 15α-position. So long as the hydroxy group is esterified, the exact nature of the esterifying group is not critical. Thus, in the compounds of this invention, R can be the acyl radical of an acid customarily employed in the steroid chemistry for the esterification of free hydroxyl groups, e.g., of a saturated or unsaturated, straight-chain or branched, acid preferably one containing at least one α-hydrogen atom, including both aliphatic and aromatic unsubstituted and substituted and monobasic and polybasic acids. Preferred are esters of saturated or unsaturated aliphatic, araliphatic and aromatic carboxylic acids containing 1–18, preferably 1 to 11 carbon atoms.

Examples of 15α-esterified hydroxy groups are those containing 1 to 18, preferably 1 to 11 carbon atoms, wherein the acyl group is the acyl radical of, for example, an aliphatic acid containing 1 to 18, preferably 1 to 8 carbon atoms, e.g., formic, acetic, propionic, butyric, isobutyric, α-ethylbutyric, valeric, isovaleric, α-ethylvaleric, 2-methyl-butyric, 3-ethylbutyric, hexanoic, diethylacetic, enanthic, octanoic, undecylic and palmitic, a cyclid acid, preferably a cycloaliphatic acid, containing, e.g., 5 to 18, preferably 5 to 11 carbon atoms, e.g., cyclopropylideneacetic, cyclobutylcarboxylic, cyclopentylcarboxylic, cyclopentylacetic, β-cyclopentylpropionic, cyclohexylcarboxylic, cyclohexylacetic and β-cyclohexylpropionic acid; a carbocyclic aryl or alkaryl acid, e.g., containing 7 to 18, preferably 7 to 11 carbon atoms, and 1–2, preferably 1 ring e.g., benzoic, 2-, 3-, or 4-methylbenzoic, 2,3- 2,4-, 2,5-, 2,6-, 3,4- and 3,5-dimethylbenzoic, ethylbenzoic, 2, 4,6-trimethylbenzoic, cinnamic and 3-methyl-α-naphthoic acid; an aralkyl acid, e.g., containing 8 to 18, preferably 8 to 11, carbon atoms, e.g., phenylacetic, β-phenylpropionic, diphenylacetic, biphenylacetic and α-naphthylacetic acid; a dibasic acid, e.g., containing 2 to 18, preferably 4 to 6, carbon atoms e.g., succinic, glutaric, α-methylglutaric, β - methylglutaric, β,β - dimethylglutaric, adipic, pimelic and suberic acid; a hydroxy acid, e.g., containing 2 to 18, preferably 2 to 11 carbon atoms and 1 to 5 hydroxy groups, e.g., glycolic, lactic, citric, tartaric, d-maleic, d-glyceric, mannonic, gluconic and salicylic acid; an amino acid, e.g., glycine, aminopropionic, diglycollamic, triglycollamic, methylglycine, dimethylglycine, diethylglycine, para-aminosalicylic and para-aminobenzoic acid; other hetero-substituted acids containing one, two or more of halo, alkoxy, acyloxy, sulfonyloxy, amido, sulfato, nitro, mercapto, cyano, etc., in the molecule, ethylmercaptoacetic, benzylmercaptoacetic, chloroacetic, fluoroacetic, trichloroacetic, trifluoroacetic, thioglycolic, m-nitrobenzoic, 2,3,4-trimethoxybenzoic, phenoxyacetic α-naphthoxyacetic and β-pyrrolidylpropionic acid; carbamic acids, e.g., carbamic acid, phenylcarbamic, n-butylcarbamic, dimethylcarbamic, diethylcarbamic and allophanic acid; a heterocyclic acid, e.g., β-furylcarboxylic, pyrrole-carboxylic, N-methylpyrrolidyl-2-carboxylic, α-picolinic, nicotinic, indole-2-carboxylic, 6-hydroxyindolyl-3-acetic and N-methylmorpholyl-2-carboxylic and pyrrolyl-2-carboxylic acid.

In the compounds of this invention, the 15α-esterified hydroxy group can also be a sulfonyloxy group, e.g., wherein the sulfonyl group is arylsulfonyl, e.g., benzenesulfonyl, p-toluenesulfonyl, m,m'-dimethylbenzenesulfonyl, o,o'-dimethylbenzenesulfonyl, sym.-trimethylbenzenesulfonyl, sym.-triethylbenzenesulfonyl, m-ethylbenzenesulfonyl, para-isopropylbenzenesulfonyl, m-n-butylbenzenesulfonyl, or is alkylsulfonyl, e.g., methanesulfonyl, ethanesulfonyl, propanesulfonyl, isopropanesulfonyl, butanesulfonyl, tert.-butanesulfonyl, pentanesulfonyl, isopentanesulfonyl, hexanesulfonyl, heptanesulfonyl, octylsulfonyl or heterocyclic sulfonyl, e.g., α-pyridinesulfonyl, α-pyranesulfonyl, α-thiophenesulfonyl, α-furansulfonyl, α-tetrahydrofuransulfonyl, or other alkyl-, carbocyclic and heterocyclic aryl-, alkaryl- and aralkyl-sulfonyl group, preferably one containing 1–8 carbon atoms and 0–2, preferably 0–1 N, S or O hetero atoms, which are preferably ring carbon atoms, in the heterocyclic ring (R' group).

The 3-position substituent of the compounds of this invention is an oxo (=O) or oxy (—OR') group, the latter being in either the α- or β-stereoconfiguration. When the 3-position substituent is an oxy group, the group can be a free or esterified hydroxy group or a readily cleavable ether group as defined hereinafter, e.g., a tetrahydropyranyl or glycosidal ether, such as are conventionally present in cardiac-active steroids. See, M. L. Wolfrom and A. Thompson, "The Carbohydrates," Chapter IV (1957) Academic Press, Inc.; Fieser and Fieser, "Steroids," Chapter 20 (1959), Reinhold Pub. Co.

When R' in the 3-position is acyl, the acyl group can be identical to or different from R. As stated above, the —OR' group can also be a tetrahydropyranyloxy group or another readily cleavable ether group, e.g., a glycoside of either the D- or L-series.

A glucoside can be produced by reacting the 3-hydroxy compound with a blocked halogen sugar, e.g., in the presence of silver carbonate and calcium oxide or other weak base which will react with halogen. The blocking groups can thereafter be removed, if desired, by conventional procedures.

The protected halogenosugars are prepared by the methods described in W. W. Zorbach, R. S. Tipson: Synthetic Procedures in Nuclei Acid Chemistry, vol. 1, Interscience Publishers, 1968, or see: Advances in Carbohydrate Chemistry, vol. 10, Academic Press, 1955, pp. 247–249, 251–253.

Examples of 3-glucosides which can be produced from the corresponding sugar chloride or bromide are the pyranosyl and furanosyl sugar ethers, e.g., β-D-tetraacetylglucopyranosyl, tetra - O - acetyl - β - D - fructopyranosyl, tetra - O - acetyl - D - fructofuranosyl, tetra-O - acetyl - β - D - galactofuranosyl, tetra-O-acetyl-α-D-galactopyranosyl, 2,3,4,6-tetra - O - acetyl-glucopyranosyl, 2,3,5,6 - tetra - O - acetyl - glucofuranosyl, 2,3,4,6-tetra-O-acetyl-α-D-mannopyranosyl, 2,3,4-tri-O-benzoyl - rhamnopyranosyl, 1,3,4,5 - tetra - O - acetyl - sorbopyranosyl and 2,3,4 - tri - O - acetylxylopyranosyl, 2,3,4-tri-O-acetyl-rhamnopyranosyl, 4-O-acetyl-cymaropyranosyl and 3,4-di-O-acetyl-digitoxopyranosyl ethers. For preparing the free glycosides the blocking groups, e.g., acetate groups, have to be hydrolysed by conventional procedures.

The esterification of the hydroxy group of the starting steriod (II) in the 15α-position can be conducted in accordance with methods generally known to a person skilled in the art, for example, by reaction with an acid chloride or anhydride of the corresponding acid in the presence of a base, e.g., pyridine.

The reduction of the 3-keto group also can be conducted in a conventional manner. A preferred reducing agent is lithium aluminum tri-tert.-butoxyhydride. However, other reducing agents are inert with respect to the lactone ring and ester groups, such as, for example, sodium borohydride, under the conditions of the reduction can also be employed.

The compounds of Formula I are useful in the treatment of heart insufficiencies where natural cardiac glycosides are administered. For such use, they can be formulated into conventional drug forms with the additives, carrier substances, and flavoring agents customary in pharmaceutical preparations which do not deleteriously react with the effective agents, employing conventional methods. For oral application, particularly suitable are tablets, dragees, capsules, pills, suspensions and solutions. Such compositions can employ, for example, water, alcohol, polyethylene glycols, gelatin, sucrose, lactose, amylose in solutions and suspensions and magnesium stearate, talc, starch, sugars, etc., in tablets. The concentration of the effective agent in the thus-formulated compositions is dependent on the activity of the specific compounds employed, the responsiveness of the individual patient and the mode of administration.

Tablets usually contain, for example, 2–50 mg. of effective agent and 20–500 mg. of a pharmacologically inactive excipient, preferably about 3 to 6 mg. per unit dosage.

For parenteral application, aqueous or oily solutions or suspensions can be used.

In the following examples, the temperatures are set forth in degrees centigrade.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Preparation.—14β,15α-dihydroxy-3-oxo-4,20(22)-cardadienolide 10 g. of 3-oxo-4,14,20(22)-cardatrienolide is mixed, in 300 ml. of tert.-butanol and 500 ml. of ethylene chloride, with 6.5 g. of m-chloroperbenzoic acid. After allowing the reaction mixture to stand for 20 hours at room temperature, another 1.3 g. of peracid is added. After a total of 40 hours, the reaction mixture is diluted with methylene chloride, washed twice successively with ferrous-sulfate solution, with bicarbonate solution, and with water, and the organic phase is dried and concentrated under a vacuum. 10.4 g. of a crude product is obtained. By recrystallization from ethyl acetate, 9.3 g. of 14,15α-epoxy-3 - oxo - 14α - carda - 4,20(22) - dienolide is obtained, M.P. 246.5–248.5° C.

13 g. of the above-mentioned 14,15α-epoxide is dissolved in 1.2 liters of dioxane, mixed with a mixture of 400 ml. of water and 10 ml. of 70% perchloric acid, and thereafter heated for 16 hours to 55° C. The reaction mixture is then concentrated under a vacuum to about 600 ml. and poured into ice water. A thorough extraction step is conducted with methylene chloride, and the organic phase is washed neutral with water, dried, and concentrated under a vacuum. By recrystallization of the residue from ethyl acetate/methanol, 7.8 g. of 14β,15α-dihydroxy-3-oxo-4,20(22)-cardadienolide is obtained, M.P. 244.5–246° C.

EXAMPLE 1

160 mg. of 14β,15α - dihydroxy-3-oxo-4,20(22)-cardadienolide is reacted with 0.32 ml. of acetic anhydride in 0.64 ml. of absolute pyridine. After allowing the reaction mixture to stand for 15 hours at room temperature, it is poured into ice/sodium chloride solution. The thus-produced precipitate is filtered off, washed with water, and recrystallized, after drying, from ethyl acetate, thus obtaining 92 mg. of 14β-hydroxy-15α-acetoxy-3-oxo-4,20 (22)-cardadienolide, M.P. 241–243° C.

EXAMPLE 2

1.56 g. of 14β,15α-dihydroxy-3-oxo-4,20(22)-cardadienolide is mixed, in 11 ml. of pyridine, dropwise with a solution of 4.32 ml. of benzoyl chloride in 3 ml. of ether, and allowed to stand for 18 hours at room temperature. The reaction mixture is then diluted with ether, the ether phase washed with dilute sulfuric acid, water, bicarbonate solution, and water, and the dried ether solution is concentrated to dryness under a vacuum. After recrystallizing the residue from ethyl acetate, 1.35 g. of 14β - hydroxy - 15α-benzoyloxy-3-oxo-4,20(22)-cardadienolide is obtained, M.P. 290–292° C.

EXAMPLE 3

520 mg. of the 15α-benzoate produced in accordance with Example 2 is dissolved in 100 ml. of absolute tetrahydrofuran and mixed with 1. g. of lithium aluminum tri-tert.-butoxy-hydride. After allowing the reaction mixture to stand at room temperature for 18 hours, 2 ml. of methanol is added thereto, and the tetrahydrofuran is removed under a vacuum. The residue is taken up in methylene chloride, washed with water, dried, and concentrated to dryness. A chromatographical separation on silica gel with methylene chloride/acetone results in 120 mg. of 3α,14β - dihydroxy - 15α - benzoyloxy-4,20(22)-cardadienolide, M.P. 222–224° C. (recrystallized from hexane) and 160 mg. of 3β,14β-dihydroxy-15α-benzoyloxy-4,20(22)-cardadienolide, M.P. 241–243° C. (recrystallized from ethyl acetate).

EXAMPLE 4

1.55 g. of 14β,15α-dihydroxy-3-oxo-4,20(22)-cardadienolide is dissolved in 20 ml. of absolute dioxane, and 10 ml. of absolute pyridine is added thereto. Underagitation and cooling, the reaction mixture is mixed dropwise with a solution of 0.68 ml. of hexahydrobenzoyl chloride in 10 ml. of absolute ether. After allowing the reaction mixture to stand for 24 hours at room temperature, it is diluted with ether, washed with water, dried, and concentrated under a vacuum. The residue is recrystallized from ethyl acetate, thus obtaining 1.28 g. of 14β-hydroxy-15α - hexahydrobenzoyloxy - 3 - oxo-4,20(22)-cardadienolide, M.P. 237.5–238.5° C.

EXAMPLE 5

0.8 g. of the hexahydrobenzoate prepared according to Example 4 is reduced in 15 ml. of absolute tetrahydrofuran with 1 g. of lithium aluminum tri-tert.-butoxyhydride according to Example 3. After working up the reaction mixture, and by chromatographic separation on silica gel and recrystallization from ethyl acetate, 0.21 g. of 3α,14β - dihydroxy-15α-hexahydrobenzoyloxy-4,20(22)-cardadienolide is obtained, M.P. 185.5–188° C., in addition to 0.11 g. of 3β,14β-dihydroxy-15α-hexahydrobenzoyloxy-4,20(22)-cardadienolide, M.P. 235–236.5° C.

EXAMPLE 6

1.55 g. of 14β-15α-dihydroxy-3-oxo-4,20(22)-cardadienolide is dissolved in 8 ml. of absolute pyridine, and 1.5 ml. of cyclobutanecarboxylic acid anhydride is added thereto. After allowing the reaction mixture to stand for 20 hours at room temperature, it is heated to 50° C. for another 6 hours. Thereafter, the reaction mixture is stirred into ice water, and the thus-produced precipitate (1.75 g.) is filtered off. After purifying the dried crude product by chromatography and recrystallization from ethyl acetate, 1.02 g. of 14β-hydroxy-15α-cyclobutylcarboxy - 3 - oxo-4,20(22)-cardadienolide is obtained, M.P. 248–249° C.

EXAMPLE 7

0.8 g. of the cyclobutylcarboxylic acid ester prepared according to Example 6 is reduced in 25 ml. of absolute tetrahydrofuran with 1 g. of lithium aluminum tri-tert.-butoxyhydride, in accordance with Example 3. After working up the reaction product and chromatographic separation on silica gel, there are obtained 3α,14β-dihydroxy-15α-cyclobutylcarboxy - 4,20(22) - cardadienolide (0.13 g., recrystallized from ether, M.P. 146–148° C.) and 3β,14β - dihydroxy - 15α-cyclobutylcarboxy-4,20(22)-cardadienolide (0.21 g., recrystallized from ethyl acetate, M.P. 213–217° C.).

EXAMPLE 8

1.55 g. of 14β,15α-dihydroxy-3-oxo-4,20(22)-cardadienolide is dissolved in a mixture of 20 ml. of absolute dioxane and 10 ml. of absolute pyridine. Under agitation and cooling, a solution of 1.4 g. of p-nitrobenzoyl chloride in 12 ml. of absolute ether is added dropwise to the reaction mixture. After allowing the mixture to stand for 40 hours at room temperature, another 0.5 g. of acid chloride in 5 ml. of absolute ether is added thereto, and after allowing the mixture to stand another 24 hours, it is diluted with water and extracted with methylene chloride. The combined extracts are concentrated after drying, and the residue is chromatographed on silica gel. After recrystallization from acetone, 1.3 g. of 14β-hydroxy-15α-(4' - nitrobenzoyloxy)-3-oxo-4,20(22)-cardadienolide is obtained, M.P. 244–245.5° C.

EXAMPLE 9

0.8 g. of the p-nitrobenzoate produced according to Example 8 is reduced, in 50 ml. of absolute tetrahydrofuran, with 1 g. of lithium aluminum tri-tert.-butoxyhydride, according to Example 3. After working up the reaction mixture, chromatographic separation on silica gel, and recrystallization from ethyl acetate, 0.18 g. of 3α, 14β-dihydroxy-15α - (4' - nitrobenzoyloxy) - 4,20(22)-cardadienolide is obtained, M.P. 216–219° C., in addition to 0.20 g. of 3β,14β-dihydroxy-15α-(4'-nitrobenzoyloxy)-4,20(22)-cardadienolide, M.P. 229–230° C.

EXAMPLE 10

One gram of 3β,14β - dihydroxy - 15α-benzoyloxy-4,20(22)-cardadienolide is dissolved in 45 ml. of boiling, absolute dioxane, and 20 g. of freshly prepared dried silver carbonate, 2 g. of calcium oxide, and 0.75 g. of activated charcoal are added thereto. Within 5 minutes 7.5 g. of acetobromoglucose in 20 ml. of absolute dioxane is added to the boiling reaction mixture. The latter is heated for another 5 minutes to the boiling point, and then vacuum-filtered from the precipitate; the filter cake is washed with chloroform, and the filtrate is concentrated under a vacuum. The oily residue is separated on 100 g. of silica gel by means of chromatography. By means of a solvent mixture of carbon tetrachloride/13–18% acetone, about 100 mg. of oily secondary products are first separated, after the solvent has been evaporated. Thereafter, by means of carbon tetrachloride/18–25% acetone, after evaporation of the solvent, about 500 mg. of an oily sugar fraction is obtained. This oily sugar fraction is dissolved in 500 ml. of methanol for purposes of saponification. The methanol solution is mixed with 5 g. of potassium bicarbonate in 120 ml. of water, and the reaction mixture is then allowed to stand for 6 days at room temperature. Thereafter, the methanol is evaporated under a vacuum. The remainder is extracted, after the addition of 500 ml. of water, 5 times with ether (respectively 50 ml.), 5 times with chloroform (respectively 50 ml.), and finally 10 times with respectively 50 ml. of chloroform/ethanol (9:1). The combined chloroform and chloroform/ethanol extracts are washed neutral, dried, and concentrated to dryness under a vacuum. The residue is purified by thin-layer chromatography on silica gel. The thus-obtained crude product is dissolved in methanol. After the addition of ether, 90 mg. of 14β-hydroxy - 15α - benzoyloxy-3β-(glucopyranosyl-1'-oxy)-4,20(22)-cardadienolide is obtained.

EXAMPLE 11

One gram of 3β,14β - dihydroxy - 15α-benzoyloxy-4,20(22)-cardadienolide in 10 ml. of absolute pyridine is acylated with 1.2 g. of triacetoxypivalyl chloride, diluted with water after 48 hours, extracted with methylene chloride, and, after washing the methylene chloride solution neutral and drying the same, the reaction mixture is concentrated to dryness. After purifying the residue by chromatography on silica gel, and recrystallization from ether, 430 mg. of 14β-hydroxy-3-β-(triacetoxy-methylacetoxy) - 15α - benzoyloxy-4,20(22)-cardadienolide is obtained, M.P. 148–149° C. This triacetate is saponified in 70 ml. of methanol with 430 mg. of sodium bicarbonate in 15 ml. of water. After 24 hours, the reaction mixture is poured into aqueous sodium chloride solution and extracted, after removing the methanol under a vacuum, with chloroform and chloroform/ethanol (9:1). The combined extraction solutions are washed neutral, dried, and then concentrated to dryness under a vacuum. The residue is filtered over silica gel, and the thus-obtained crude product is recrystallized from ethyl acetate/ether, thus obtaining 14β - hydroxy - 3β-(trihydroxymethylacetoxy)-15α-benzoyloxy-4,20(22)-cardadienolide.

EXAMPLE 12

2.41 g. of 14β,15α-dihydroxy-3-oxo-4,20(22)-cardadienolide is suspended in 35 ml. of absolute dioxane and 0.75 ml. of absolute pyridine and mixed dropwise under stirring with 1.13 g. of succinic acid monomethyl ester chloride in 16 ml. of absolute ether. After 24 hours of agitation, another 0.75 ml. of pyridine and 1.13 g. of acid chloride are added thereto. After stirring for 60 hours, the reaction mixture is poured into ice water, extracted with methylene chloride, and the extract is dried. The solution is concentrated under a vacuum to dryness. By purifying the residue by chromatography on silica gel, 680 mg. of crude 14β-hydroxy-15α-(3'-methoxycarbonylpropionyloxy)-3-oxo-4,20(22)-cardadienolide is obtained, melting, after recrystallization from ethyl acetate, at 127–131° C.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A 14β-hydroxy-15α-acyloxy-cardenolide of the formula

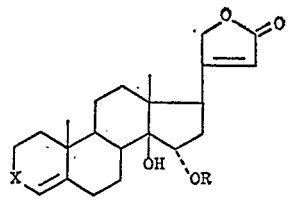

wherein —OR is an esterified hydroxy group and X is >C=O or >CH—OR' in which —OR' is a free or esterified hydroxy group, or tetrahydropyranyloxy group or glycosidal etherified hydroxy group.

2. A compound of claim 1 wherein X is >C=O.
3. A compound of claim 1 wherein X is >CHOH.
4. A compound of claim 1 wherein R is the acyl radical of hydrocarbon carboxylic acid containing from 1 to 18 carbon atoms.
5. A compound of claim 1, 14β-hydroxy-15α-acetoxy-3-oxo-4,20(22)-cardadienolide.
6. A compound of claim 1, 14β-hydroxy-15α-benzoyloxy-3-oxo-4,20(22)-cardadienolide.
7. A compound of claim 1, 3α,14β-dihydroxy-15α-benzoyloxy-4,20(22)-cardadienolide.
8. A compound of claim 1, 3β,14β-dihydroxy-15α-benzoyloxy-4,20(22)-cardadienolide.
9. A compound of claim 1, 14β-hydroxy-15α-hexahydrobenzoyloxy-3-oxo-4,20(22)-cardadienolide.
10. A compound of claim 1, 3α,14β-dihydroxy-15α-hexahydrobenzoyloxy-4,20(22)-cardadienolide.
11. A compound of claim 1, 3β,14β-dihydroxy-15α-hexahydrobenzoyloxy-4,20(22)-cardadienolide.
12. A compound of claim 1, 14β-hydroxy-15α-cyclobutylcarboxy-3-oxo-4,20(22)-cardadienolide.
13. A compound of claim 1, 3α,14β-dihydroxy-15α-cyclobutylcarboxy-4,20(22)-cardadienolide.
14. A compound of claim 1, 3β,14β-dihydroxy-15α-cyclobutylcarboxy-4,20(22)-cardadienolide.
15. A compound of claim 1, 14β-hydroxy-15α-(4'-nitrobenzoyloxy)-3-oxo-4,20(22)-cardadienolide.
16. A compound of claim 1,3α,14β-dihydroxy-15α-(4'-nitrobenzoyloxy)-4,20(22)-cardadienolide.
17. A compound of claim 1, 3β,14β-dihydroxy-15α-(4'-nitrobenzoyloxy)-4,20(22)-cardadienolide.
18. A compound of claim 1, 14β-hydroxy-15α-benzoyloxy-3β-(glucopyranosyl-1'-oxy)-4,20(22)-cardadienolide.
19. A compound of claim 1, 14β-hydroxy-3β-(triacetoxymethylacetoxy)-15α-benzoyloxy - 4,20(22) - cardadienolide.
20. A compound of claim 1, 14β-hydroxy-3β-(trihydroxymethylacetoxy)-15α-benzoyloxy-4,20(22) - cardadienolide.
21. A compound of claim 1, 14β-hydroxy-15α-(3'-methoxycarbonylpropionyloxy) - 3 - oxo - 4,20(22) - cardadienolide.

References Cited
UNITED STATES PATENTS 3,455,910  7/1969  Fritsch et al. _____ 260—239.57

ELBERT L. ROBERTS, Primary Examiner

U.S. Cl. X.R.

260—239.57